United States Patent [19]
Fellmann

[11] 4,360,971
[45] Nov. 30, 1982

[54] GARDEN TRIMMER

[75] Inventor: Ruedi Fellmann, Dietlikon, Switzerland

[73] Assignee: Max Langenstein Feld- und Gartengeräte GmbH & Co., Illertissen, Fed. Rep. of Germany

[21] Appl. No.: 260,929

[22] Filed: May 6, 1981

[30] Foreign Application Priority Data

May 13, 1980 [DE] Fed. Rep. of Germany ... 8012962[U]

[51] Int. Cl.³ .......................................... A01D 55/00
[52] U.S. Cl. .................................. 30/296 R; 30/276; 56/256
[58] Field of Search ................... 30/296 R, 347, 276; 56/256, 12.7

[56] References Cited

U.S. PATENT DOCUMENTS

| | | | |
|---|---|---|---|
| 2,810,409 | 10/1957 | Ibelle | 30/296 X |
| 3,949,817 | 4/1976 | Rice | 30/296 X |
| 4,179,805 | 12/1979 | Yamada | 30/296 R X |
| 4,200,978 | 5/1980 | Irelan | 30/276 |
| 4,226,021 | 10/1980 | Hoff | 30/276 |
| 4,285,128 | 8/1981 | Schnell | 30/276 |

*Primary Examiner*—Jimmy C. Peters
*Attorney, Agent, or Firm*—Karl F. Ross

[57] ABSTRACT

A garden trimmer has a housing containing a motor whose output is rotatable about a motor axis and is connected to a cutter line which lies in a plane perpendicular to this axis when the output is rotated. A handle shaft extends at an acute angle to the motor axis from the housing and has an outer end provided with a Y-shaped handle having a central Y-leg fixed concentrically on the outer shaft end and a pair of Y-arms, with the legs and arms generally angularly equispaced at about 120°. The handle is formed on the leg adjacent the intersection of the arms and legs with a throughgoing window in which is exposed the actuation button of an on-off switch for the motor. Thus either Y-arm of the handle can be grasped by either hand of the user, with the respective pointing or index finger engaged through the window to operate the switch, so that the tool can comfortably be used with the cutter-line plane either vertical or horizontal.

7 Claims, 6 Drawing Figures

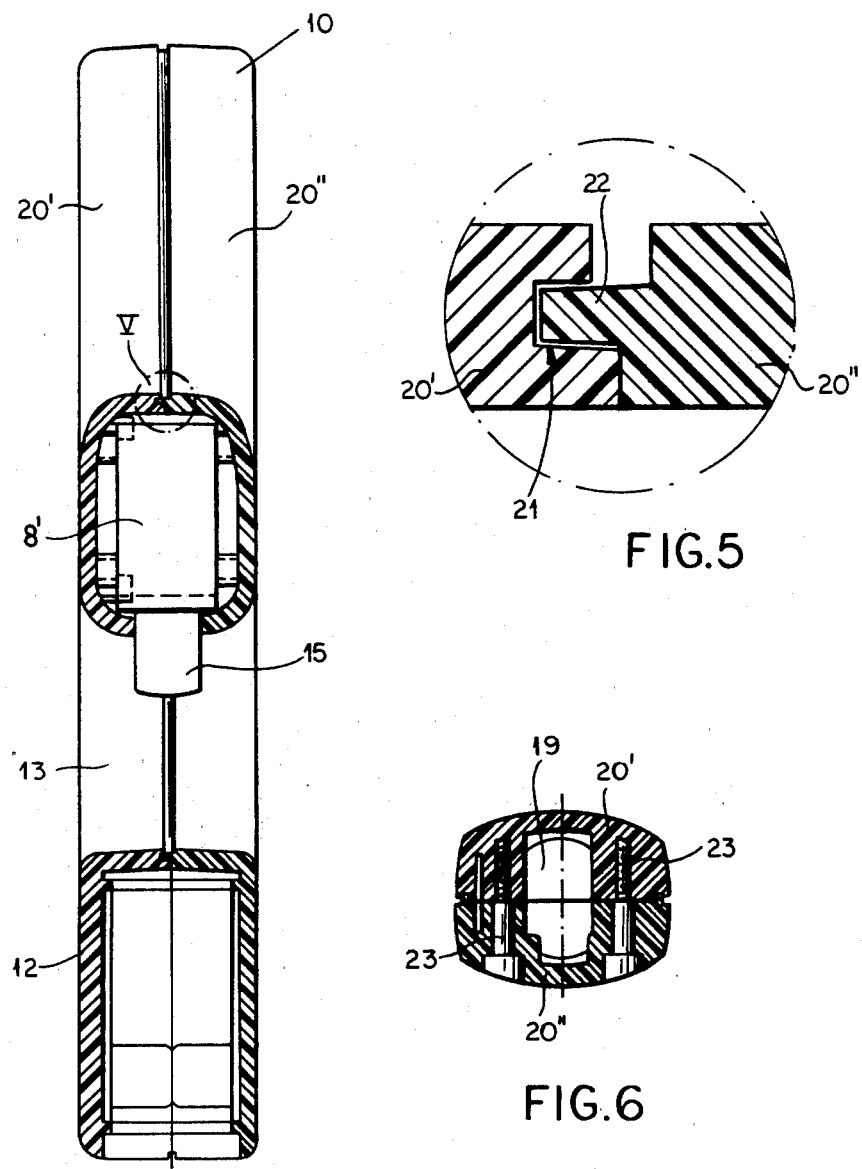

GARDEN TRIMMER

FIELD OF THE INVENTION

The present invention relates to a garden trimmer. More particularly this invention concerns such a trimmer which has a cutting element formed by a flexible filament or line.

BACKGROUND OF THE INVENTION

A garden trimmer of the so-called weed-whacker type has a housing provided with a motor whose output is rotatable about a motor axis. A cutter line normally formed of a synthetic-resin monofilament extends radially from this output when same rotates and can be used to cut vegetation, as for instance when trimming around the edge of a lawn. Normally a shaft extends at an acute angle to the motor axis up from the housing and has an outer end formed with a pistol-grip handle having a trigger that must be depressed to electrically energize the motor. This dead-man type of switch ensures that the motor can only be energized to spin the cutter line when the trigger is depressed, so that if anything goes wrong and this trigger is released the arrangement will stop.

Such systems work normally quite well so long as the motor axis is upright, that is so long as the plane of the orbit of the cutter line is parallel to the ground. When, however, the system is to be used to trim vertically, with the cutter-line plane upright, the user must normally adopt an extremely inconvenient grip on the tool. This is because when the motor axis is horizontal the grip part of the handle is pointing normally straight up from the assembly, so that the user cannot actuate the trigger with his or her pointing or index finger without twisting his or her hand around upside down. As these devices are normally designed for right-handed users, this inconvenience is frequently even greater for the left-handed.

OBJECTS OF THE INVENTION

It is therefore an object of the present invention to provide an improved trimmer of the above-described general type.

Another object is the provision of an improved trimmer which can be used in virtually any position with comfort and ease, even by left-handed persons.

SUMMARY OF THE INVENTION

These objects are attained according to the instant invention in an arrangement wherein the handle at the outer end of the shaft extending from the motor housing is Y-shaped, formed with a central Y-leg fixed on and generally concentric with the outer shaft end, and with a pair of Y-arms each constituted as a hand grip. This Y-shaped handle is formed generally at the intersections of the Y-arms and legs and on the Y-leg with a through-going hole or window in which an actuation button of the motor switch is exposed. Backward displacement of this button, that is displacement away from the motor, closes the circuit to and electrically energizes the motor.

Thus with the system according to the present invention it is possible to grasp either of the arms of the handle, with the user's pointing or index finger engaged through the window to actuate the on-off switch. If, according to another feature of this invention, the Y-legs and arms are generally angularly equispaced at about 120° this means that there will always be a hand grip that is convenient, no matter what the orientation of the motor axis. One of the hand grips is generally parallel to the motor axis so that if the tool is turned up with the cutter-line plane vertical one hand grip will be convenient to hold, with the pointing or index finger of the hand holding the generally horizontal hand grip engaged through the switch window.

According to another feature of this invention one of the Y-arms is longer than the other and has an outer arm end from which leads the electric cord that is connected through the switch to the electric motor in the housing at the opposite end of the shaft. A strain-relief clamp is provided in this longer Y-arm to hold the cord. Furthermore the outer end of the shaft is normally of nonround section and fits in a complementary recess or passage in the Y-leg so that rotation of the handle on the shaft is impossible.

The handle according to this invention is formed of a pair of complementary handle parts or shells each of Y-shape. The one part has a peripheral ridge that fits within a peripheral groove on the other part so that the two are fixed solidly together and entry of liquid or foreign matter is impossible.

DESCRIPTION OF THE DRAWING

FIG. 4 is a longitudinal section taken along line IV—IV of FIG. 3;

FIG. 5 is a large-scale view of the detail shown at V in FIG. 4; and

FIG. 6 is a cross section taken along line VI—VI of FIG. 3.

SPECIFIC DESCRIPTION

Figure 1:
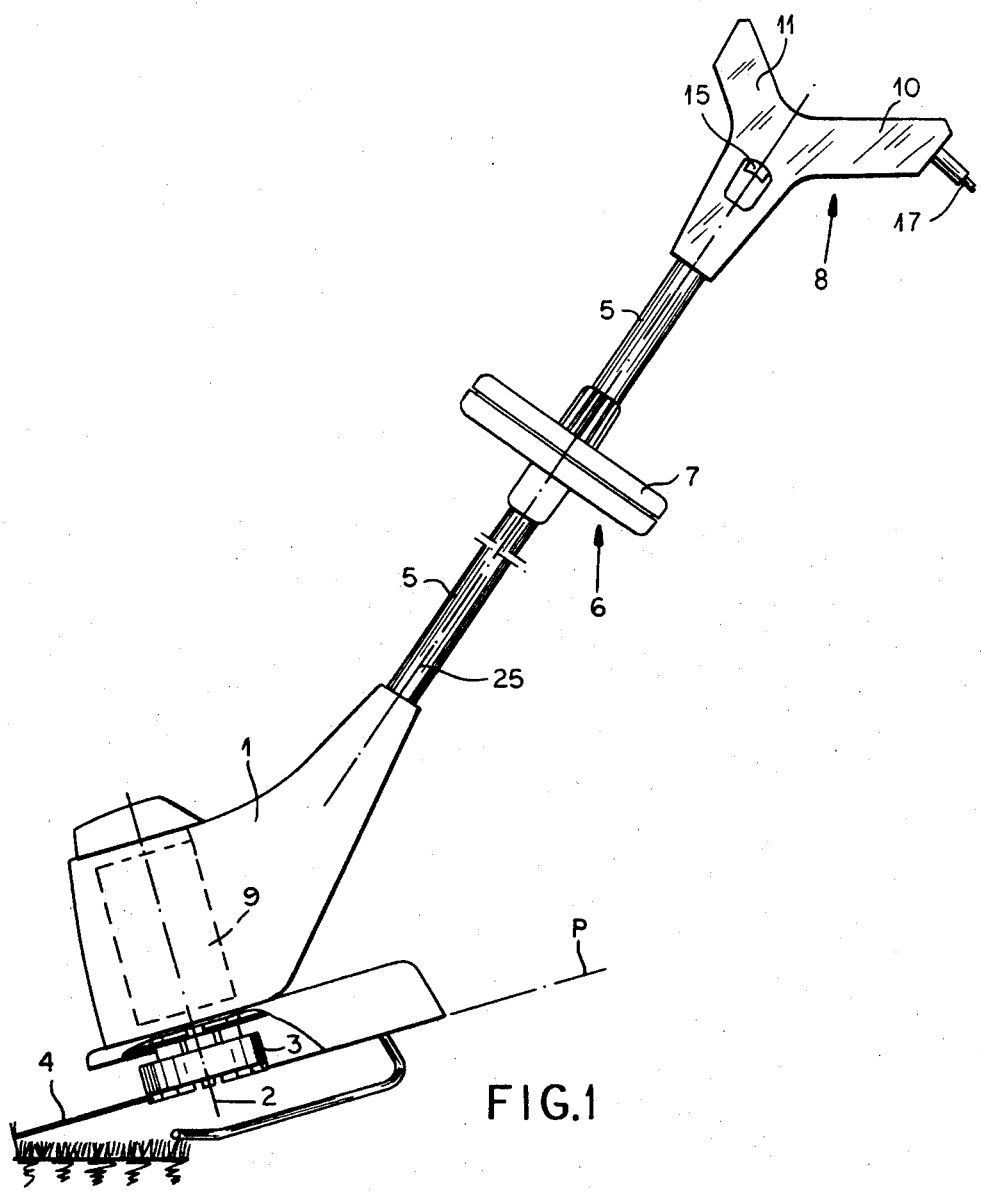
FIG. 1 is a side elevational view of the apparatus according to the instant invention with the cutter-line plane generally horizontal.

As seen in FIG. 1 the apparatus according to the instant invention has a head or housing 1 provided internally with an electric motor 9 which rotates an output member constituted as a spool hub 3 about an axis 2. A nylon monofilament line 4 extends radially from the spool hub 3 and lies in a plane perpendicular to the axis 2 when the hub 3 is rotated at high speed.

A tubular handle shaft 5 extends along a handle axis 25 from the housing 1, with the axes 2 and 25 forming an angle of 50° to each other. Around midway along this handle shaft a grip 6 in the form of a circular disk 7 is provided for gripping by the one hand of the user of the tool according to this invention. The outer end of the shaft 5 carries a Y-shaped handle 8 from which extends the electric cord 17 that the motor 9 is powered from.

Figure 3:
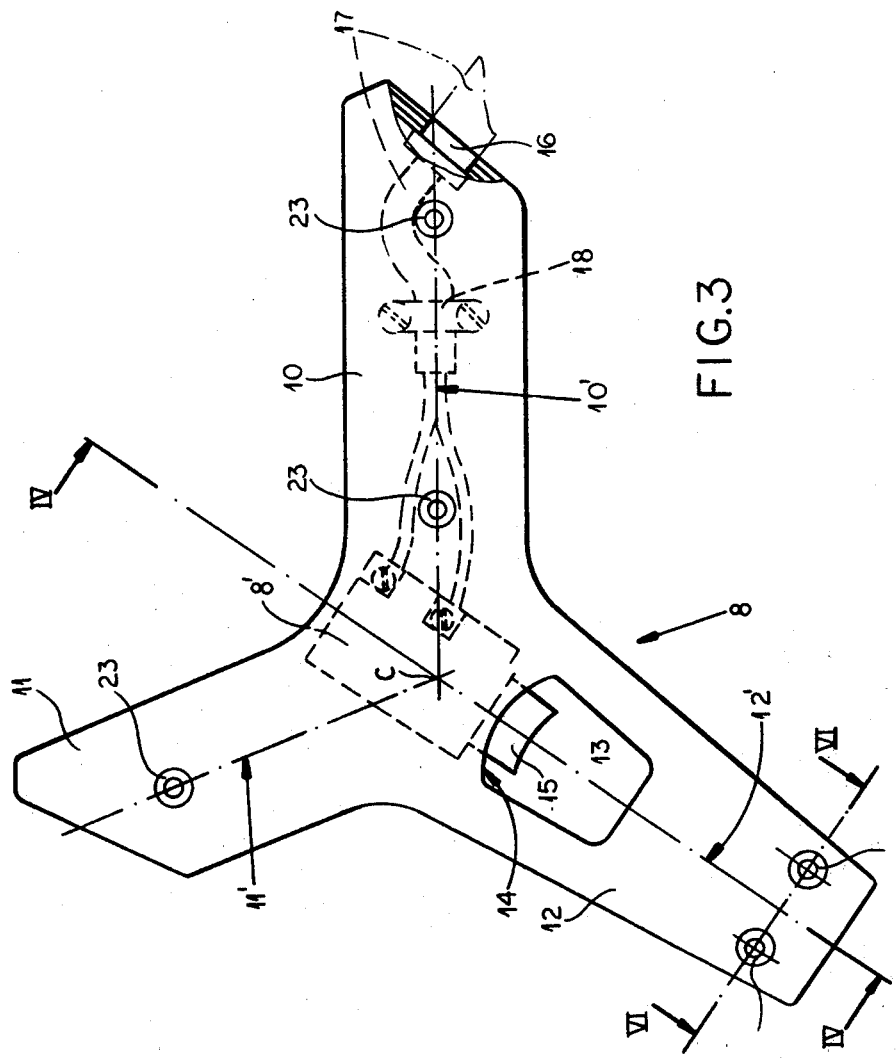
FIG. 3 is a large-scale view of the handle of the apparatus of the present invention.

The handle 8 itself, as shown in FIG. 3 in some detail, has a pair of Y-arms 10 and 11 and a central Y-leg 12 that are angularly equispaced about the center C where their coplanar axes 10', 11', and 12' intersect. The leg 12 is formed immediately ahead, that is toward the housing 1, of the center C with a window 13 going perpendicularly through the plane of the axes 10', 11', 12' and 25. This window 13 has a rear edge 14 from which a button 15 of a switch 8' projects forwardly. This switch 8' is connected in circuit between the incoming line cord 17 and the motor 9 and only allows the motor 9 to be energized from the cord 17 when the button 15 is depressed backwardly toward the rear edge 14.

The one Y-arm 10 is slightly longer than the other arm 11 and is formed at its outer arm end with a hole 16 through which the cord 17 extends. In addition this arm 10 is provided internally with a standard strain-relief clamp 18 for the cord 17.

FIGS. 4–6 show how the handle 8 is formed as a pair of geometrically complementary and similar shells 20′ and 20″ secured together by screws 23. The shell 20′ is formed with a peripheral groove 21 in which a peripheral ridge 22 of the shell 20″ is snugly seated, as best seen in FIG. 5. Thus the two halves are hermetically fixed together. In addition the upper or outer end of the shaft 5 is flattened and received in a flattened recess or passage 19 of the leg 12 so that the handle 8 cannot rotate on the shaft 5. The other end of the shaft 5 is similarly seated in the housing 1.

With the system according to the instant invention, therefore, it is possible for the user to hold the handle 8 by either of the Y-arms 11 or 12, with either hand. No matter which hand is used it is convenient to pass the pointing or index finger completely through the window 14 to actuate the switch 15. The user's other hand normally grasps the handle disk 7 on the shaft 5.

Figure 2:
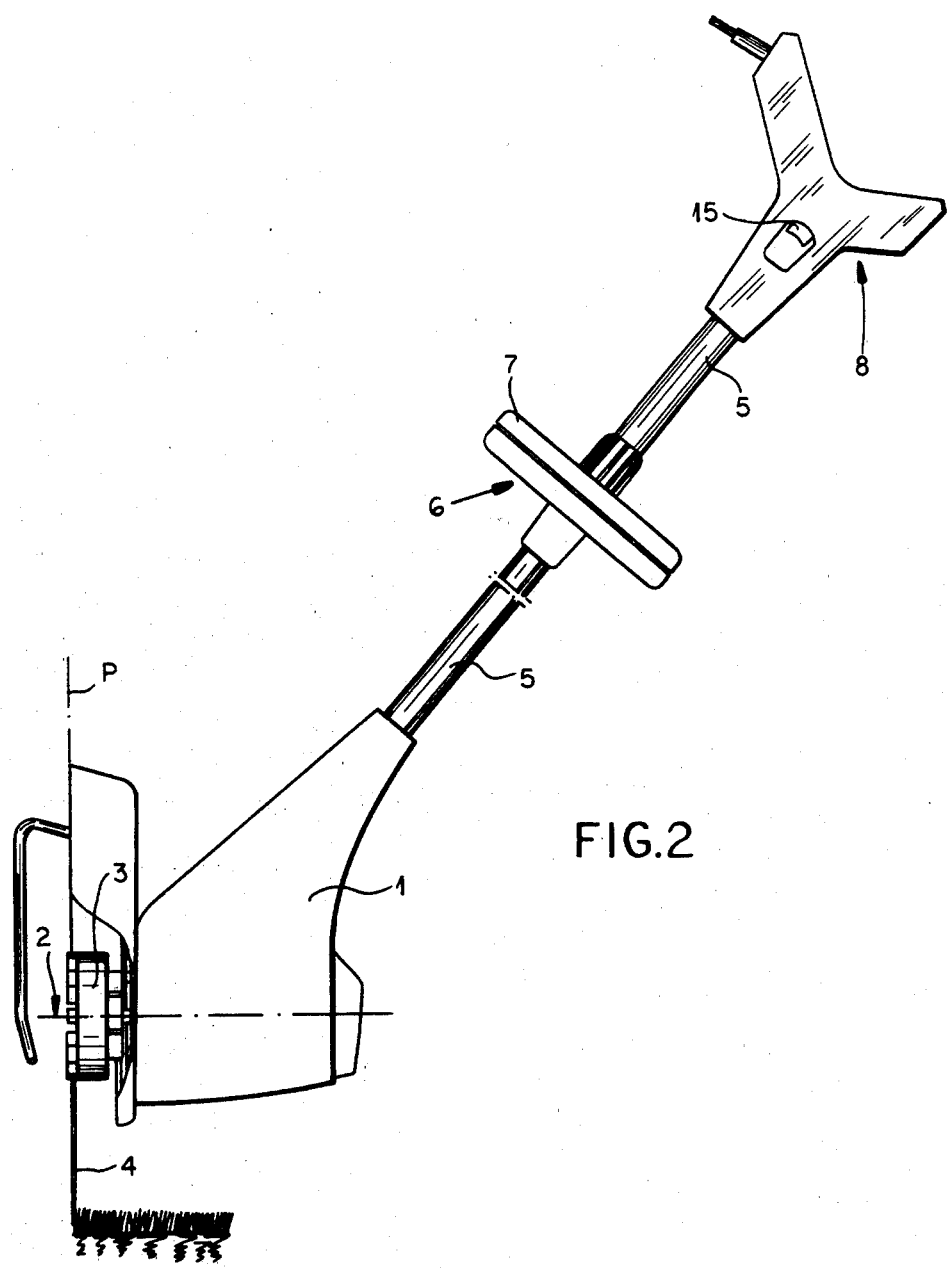
FIG. 2 is a side elevational view of the apparatus according to the instant invention with the cutter-line plane generally vertical.

When the system is used in the standard fashion with the plane P of the cutter line 4 generally parallel to the horizontal ground, as shown in FIG. 1, the tool is most conveniently grasped by the handle arm 10. When, however, the plane P should be vertical as shown in FIG. 2 it is equally as convenient to grasp the handle arm 11 to support the tool. Both grips are completely comfortable, and require no uncomfortable twisting of the wrist or holding of the hand in an uncomfortable position for the two main modes of use of the tool according to the instant invention. In addition either grip is equally comfortable for a right-handed or left-handed person, and both grips employ the pointing or index finger on the same switch, so that no second switch need be provided.

I claim:
1. A garden trimmer comprising:
   a housing;
   a motor in said housing having an output rotatable about a motor axis;
   a cutter line attached to said output and extending radially therefrom on rotation of said output;
   a shaft extending at an acute angle to said motor axis from said housing and having an outer end remote from said housing;
   a Y-shaped handle having a central Y-leg fixed on said outer end and generally concentric therewith, and a pair of Y-arms each formed as a hand grip, said handle being formed generally at the intersection of said arms and leg with a throughgoing window having a rear edge directed toward said housing; and
   a switch in said handle having an actuation button extending forwardly toward said housing from said rear edge of said window and displaceable backwardly to energize said motor.

2. The trimmer defined in claim 1 wherein said window lies between said Y-arms and said housing on said Y-leg.

3. The trimmer defined in claim 2 wherein said arms and legs are generally angularly equispaced about a center at said intersection.

4. The trimmer defined in claim 2 wherein one of said arms is longer than the other arm and has an outer arm end, said trimmer further comprising an electric cord connected through said switch to said motor and connected to said trimmer at said outer arm end.

5. The trimmer defined in claim 2 wherein said handle is formed of a pair of complementary Y-shaped handle parts fitting together at a plane, said shaft and axis lying generally on said plane.

6. The trimmer defined in claim 5 wherein said Y-shaped handle parts are formed with complementary interfitting grooves and ridges.

7. The trimmer defined in claim 2 wherein one of said arms is generally parallel to said axis.

* * * * *